S. G. WILSON.
HANDLE ATTACHMENT FOR IMPLEMENT HOLDERS.
APPLICATION FILED MAR. 9, 1911.
1,008,764.
Patented Nov. 14, 1911.
2 SHEETS—SHEET 1.
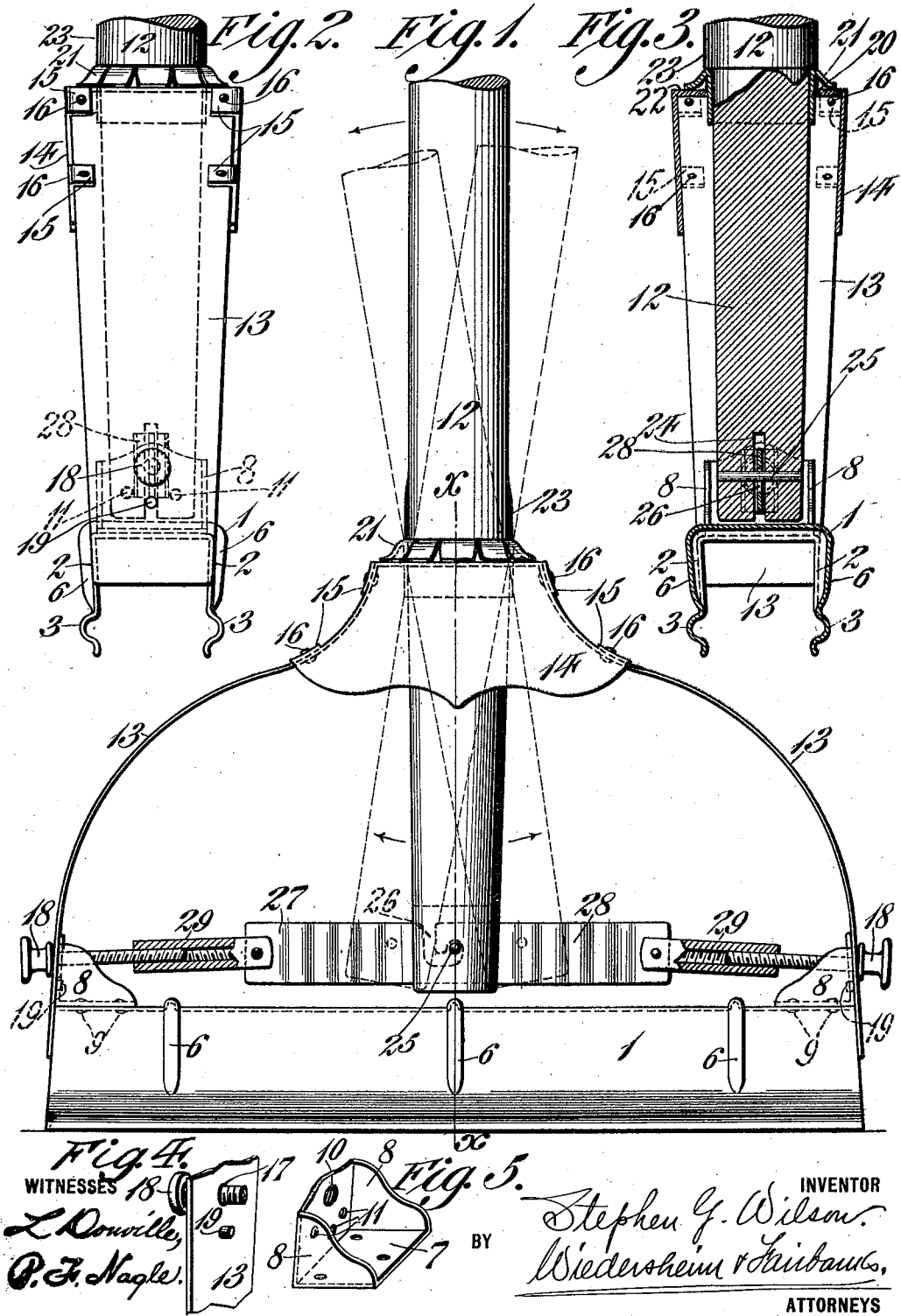
INVENTOR
Stephen G. Wilson
BY Wiedersheim & Fairbanks,
ATTORNEYS S. G. WILSON.
HANDLE ATTACHMENT FOR IMPLEMENT HOLDERS.
APPLICATION FILED MAR. 9, 1911.
1,008,764.
Patented Nov. 14, 1911.
2 SHEETS—SHEET 2.
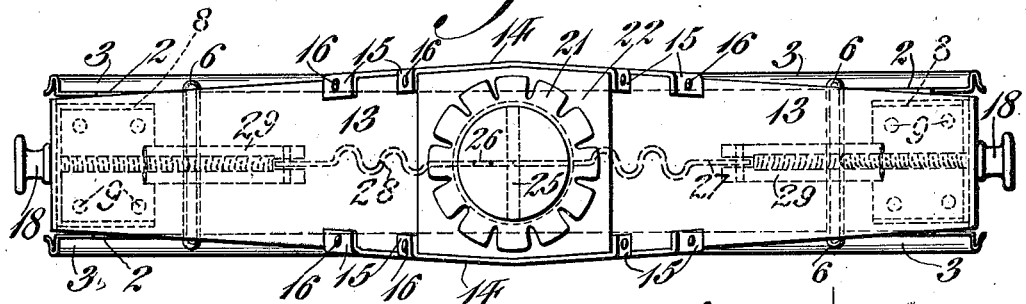
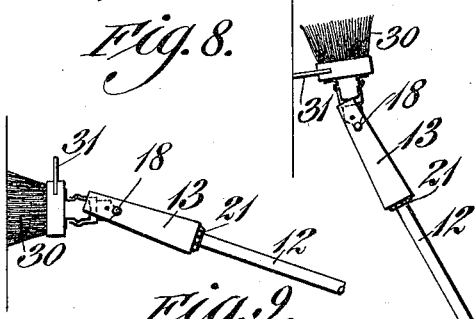
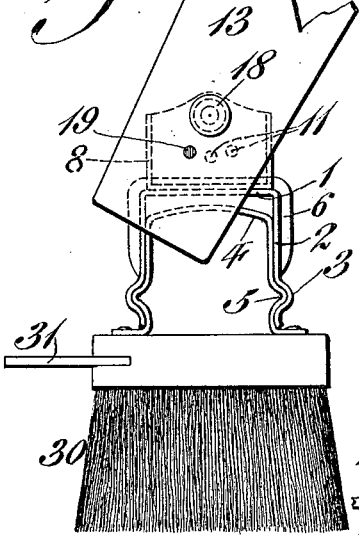
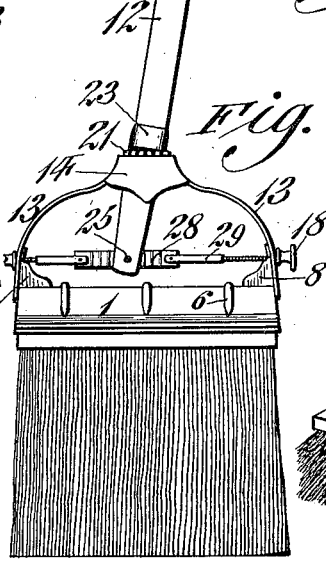
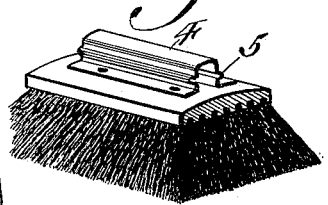
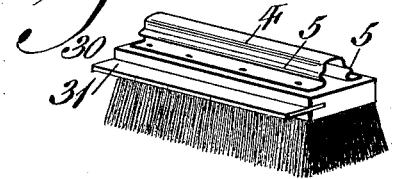
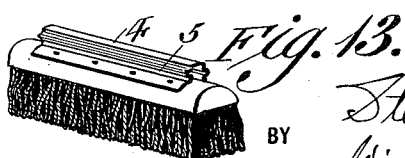
WITNESSES
INVENTOR
Stephen G. Wilson
BY
Wiederscheim & Fairbanks
ATTORNEYS
COLUMBIA PLANOGRAPH CO., WASHINGTON, D. C.

UNITED STATES PATENT OFFICE.

STEPHEN G. WILSON, OF PHILADELPHIA, PENNSYLVANIA.

HANDLE ATTACHMENT FOR IMPLEMENT-HOLDERS.

1,008,764.     Specification of Letters Patent.     Patented Nov. 14, 1911.

Application filed March 9, 1911. Serial No. 613,388.

*To all whom it may concern:*

Be it known that I, STEPHEN G. WILSON, a citizen of the United States, residing in the city and county of Philadelphia, State of Pennsylvania, have invented a new and useful Handle Attachment for Implement-Holders, of which the following is a specification.

This invention relates to implement holders and more particularly to an operating means and holder for floor brushes, window cleaning brushes, mops and sweeping brushes and the like and has for an object to provide a holder adapted to receive and retain a variety of different kinds of cleaning utensils and means for adjusting a long or short handle in connection therewith.

It has for a further object to provide flexibility between a cleaner holder and the operating means, the said flexibility being capable of regulation so that the pressure exerted upon the working surface may be varied to suit conditions of a long or short fibered brush.

It has for a still further object to provide a cleaning device which may be operated from substantially any position and yet maintain the maximum cleaning surface in contact with the working surface.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization and these instrumentalities as herein shown and described.

Figure 1 represents a side elevation of a device embodying my invention. Fig. 2 represents an end elevation for the same. Fig. 3 represents a section on line $x$—$x$, Fig. 1. Figs. 4 and 5 represent details of construction. Fig. 6 represents a plan of the device. Fig. 7 represents an end elevation of the device having a window cleaner secured thereto. Figs. 8 and 9 represent the same in different operative positions. Fig. 10 represents a side elevation of the device with a long splint floor cleaner attached thereto. Figs. 11, 12 and 13 represent perspectives of different types of brushes showing the attaching means for engagement with the holder.

Similar numerals of reference indicate corresponding parts in the figures.

Referring to the drawings:—1 designates a holder, in the present instance formed substantially U-shaped, the sides 2 thereof each having a longitudinally disposed corrugation 3 thereon whereby the said holder may engage the coöperating member 4 secured to a suitable brush back whereby the two parts are united together by slipping one within the other. This member 4 is preferably pressed from sheet metal and as here shown is substantially U-shaped having a corrugation 5 extending longitudinally of each side in order to fit within the corrugations 3 of the holder.

In order to strengthen the holder 1, transversely disposed corrugations 6 are located at suitably spaced intervals thereon and form a desirable reinforcement to prevent bending and crimping of the material. The holder 1 has secured thereto adjacent each end, an angle iron 7, provided with sides 8, for stiffening purposes, said angles being secured by rivets 9 or the like to the holder 1. Each angle is provided with an opening 10 in one face thereof adjacent which is a plurality of openings 11 for a purpose presently to be described. The holder 1 is adapted to be attached to a suitable handle 12 for proper manipulation of the cleaner member and in the present instance the attaching means consists of side arms 13 preferably of sheet metal and tapering from the handle end toward the holder 1, thereby affording a broad base adjacent the handle to more readily resist strains and stresses of use. These side arms 13, are in the present instance, formed from a single strip of spring material suitably shaped for the purpose intended and fastened together by plates 14, each of which is provided with lugs 15 overlapping the edges of the arms 13 and serving as a means by which the rivets 16 fasten the plates in position. Each arm 13 is provided with an opening 17 adjacent an end thereof, the said opening being adapted to aline with the opening 10 of the angle iron heretofore described, so that when the bolt member 18 is passed through the two openings the several parts will be accurately secured together. It will be noted that the side arms 13 when engaged by the bolts 18 are thereby normally placed under tension and held firmly against the coöperating member, the natural tendency of the spring material being to separate the said arms to release the holder engaging means now to be described.

19 designates lugs preferably formed integral with each arm 13 and so disposed as to engage one of the openings 11, the proper opening being selected with reference to the angular position desired for the operating means relative to the brush, that is to say, if the brush is to be operated with the handle 12 angularly disposed with relation thereto, as shown in Figs. 7 and 8, the pin 19 will engage one of the openings 11 eccentric to the center while if it is to be vertically with respect to the holder, it will engage the central opening 11, it of course being understood that any desired number of openings may be used according to the positions desired. It will thus be seen that when the bolts 18 are loosened, the outward spring action of the arms 13 will release the pins 19 from the coöperating member and the parts thus be disconnected.

20 designates a bushing preferably of spring material, adapted to closely fit over the handle 12, and provided with outwardly disposed downwardly turned ears 21, which latter engage the top plate 22 integral with and forming a part of the arm structure 13. The function of bushing 20 is to prevent wear on the shoulder of the handle and also serves as a flexible means for retaining certain adjuncts of the attachment device in operative position.

It will be noted that the handle 12 is provided with a shoulder or offset 23 which engages the ears 21 forming with parts hereinafter to be described, a suitable locking means to retain the handle and holder securely fastened together. From this shoulder 23 the handle 12 is preferably tapered downwardly and at its end is provided with a slot 24 transverse of which a pin 25 is disposed, the function of which is to engage the hook 26 formed in the strip 27. It will be noted that the strip 27 is provided with a plurality of convolutions 28 to accentuate the spring action and is secured at each end to an arm 13 by means of a threaded sleeve 29 and bolt 18. It will thus be apparent that when the bolts 18 are loosened sufficiently, the spring strip 27 may be shifted sufficiently to allow the pin 25 of the handle 12 to engage the hook 26, whereupon a tightening of the bolts 18 will draw the strip taut thereby bringing the shoulder 23 of the handle 12 down upon the spring ears 21, thus forming an effectual connection between the several parts. It will furthermore be apparent that the threaded sleeves 29 provide an adjusting means by which the position of the handle may be varied to suit conditions, as in operating a long fiber stub brush, Fig. 10 for sweeping mop or the like on the floor, the same is never used with a handle vertical but inclined as shown in dotted lines in Fig. 1 and by loosening one of the screws and tightening the other this adjustment may be obtained.

It will be apparent that I have devised a complete, novel combination cleaner structure wherein a holder is provided adapted for coöperation with a suitable member attached to any type of brush and as shown in certain of the figures, the device is used in connection with a window cleaning brush 30 having the usual rubber or composition scraper 31 attached thereto. In using the device on a window, wall or the like the screws 18 will both loosen up sufficiently to permit the lugs 19 to be removed from the openings 11 which they occupy in normal position and may be shifted to another opening to give the proper angle to the handle so that the cleaning surface will contact at all points with the working surface such as a window, wall or floor. It will also be obvious that varying degrees of flexibility of the handle relative to the arms 13 may be accomplished by tightening or loosening bolts 18 and thereby providing for any degree of flexibility desired since the flexibility of the brushes and handle are determined by the tension of the spring strip 27 and thus if the brush bristles were very loose and flexible, the adjustment would be such as to provide greater rigidity of the handle and its component parts while if the bristles were exceedingly stiff, a corresponding loosening of the adjusting means insures a greater flexibility and ease of operation. It will further be noted by constructing the handle 12 adjustable with respect to the side arms 13 and to the holder, that a brush such as shown in Fig. 10 may be used for sweeping purposes and still maintain all points of the brushing face in contact with the working surface. It is well known in using a broom, for instance, that the inclination of the handle causes the broom head to be tilted so that one corner really performs the sweeping operation and this soon becomes worn away on the corner nearest the user and the full effective sweeping surface is materially lessened. In my present invention the handle 12 may be so adjusted angularly as to present the entire surface of the brush to the working surface and though the handle be inclined the brush is not affected thereby and consequently wearing away takes place uniformly.

Having thus described my invention, what I claim as new and desire to secure by Letters Patent, is:—

1. In a device of the character stated, a holder, arms secured to said holder, a handle, adjusting means securing said handle to said arms and adapted to vary the position of said handle, means for holding said handle in locked engagement with said adjusting means and means on said holder for securing a brush thereto.

2. In a device of the character stated, a holder, arms secured to said holder, means for securing said arms to said holder to vary the position of said arms relative to said holder, a handle, adjusting means securing said handle to said arms and adapted to vary the position of said handle, means for holding said handle in locked engagement with said adjusting means and means on said holder for securing a brush thereto.

3. In a device of the character stated, a holder, brackets secured to said holder having a plurality of openings therein, a plurality of arms, each arm having a lug thereon adapted to coöperate with said openings whereby the position of said arms relative to said holder is varied, a handle, adjusting means securing said handle to said arms and adapted to vary the position of said handle, means for holding said handle in locked engagement with said adjusting means and means on said holder for securing a brush thereto.

4. In a device of the character stated, a holder, arms secured thereto, a handle, a strip of spring material detachably secured to said handle, adjusting means connecting each end of said strip with said arms whereby the position of said handle may be varied relative to said holder, means for holding said handle in locked engagement with said strip and means for securing a brush member to said holder.

5. In a device of the character stated, a holder, arms secured thereto, a handle having a slotted end, and provided with a shoulder, a strip of spring material passing through said slotted end, inter-engaging portions on said handle and strip, a spring member abutting said shoulder and engaging said arms and serving to hold said handle in locked engagement with said strip, adjusting means securing each end of said strip to said arms and means to secure a brush member to said holder.

6. In a device of the character stated, a holder, arms secured thereto, a slotted handle having a shoulder thereon, a pin transversely disposed through said slotted portion of said handle, a strip having a hook adapted for engagement with said pin, a spring member abutting said shoulder and engaging said arms and serving to hold said pin and hook in locked engagement, adjusting means securing each end of said strip to said arms, and means to retain a brush member in said holder.

STEPHEN G. WILSON.

Witnesses:
ROBERT M. BARR,
C. D. McVAY.

---

Copies of this patent may be obtained for five cents each, by addressing the "Commissioner of Patents, Washington, D. C."